June 28, 1955     H. C. M. H. DUESBERG     2,711,562
PRECISE ADJUSTMENT MEANS FOR CARDING MEMBERS
Filed Jan. 23, 1951                            2 Sheets-Sheet 1
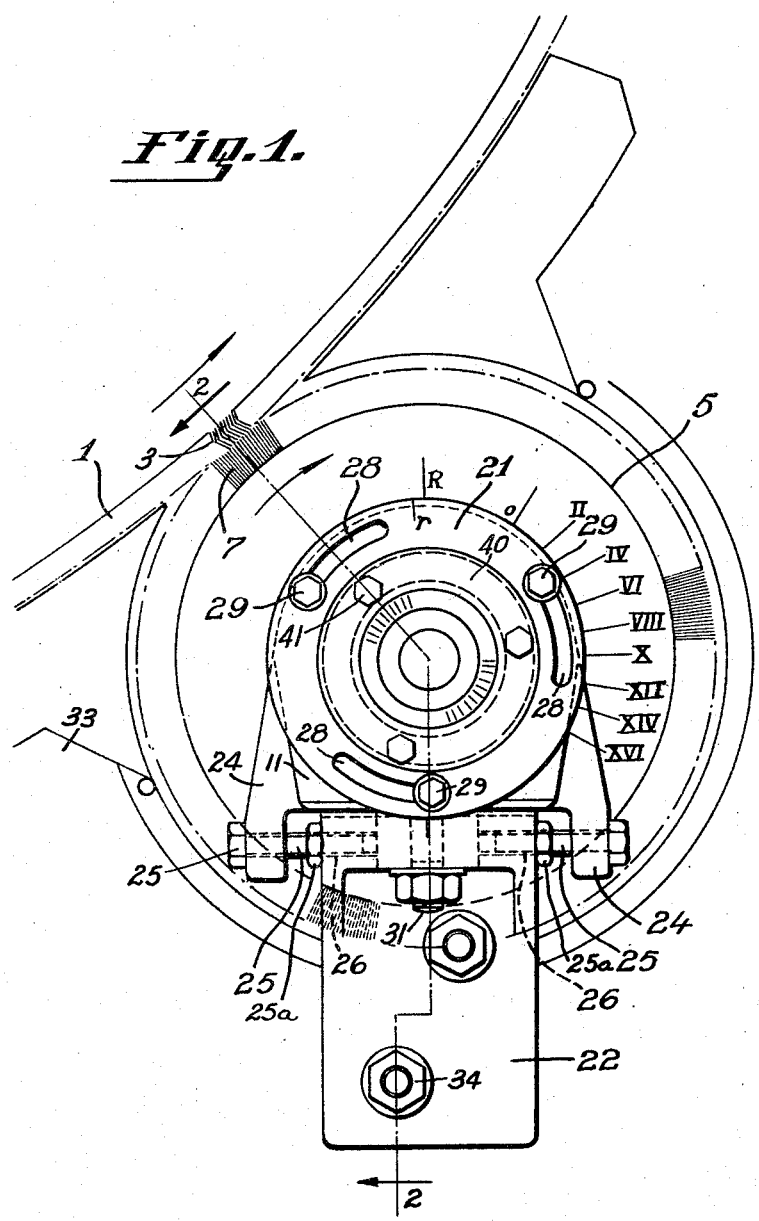
INVENTOR:
HUBERT CHARLES MARIE HENRI DUESBERG
By Richardson, David and Vordon
Attys June 28, 1955  H. C. M. H. DUESBERG  2,711,562
PRECISE ADJUSTMENT MEANS FOR CARDING MEMBERS
Filed Jan. 23, 1951  2 Sheets-Sheet 2
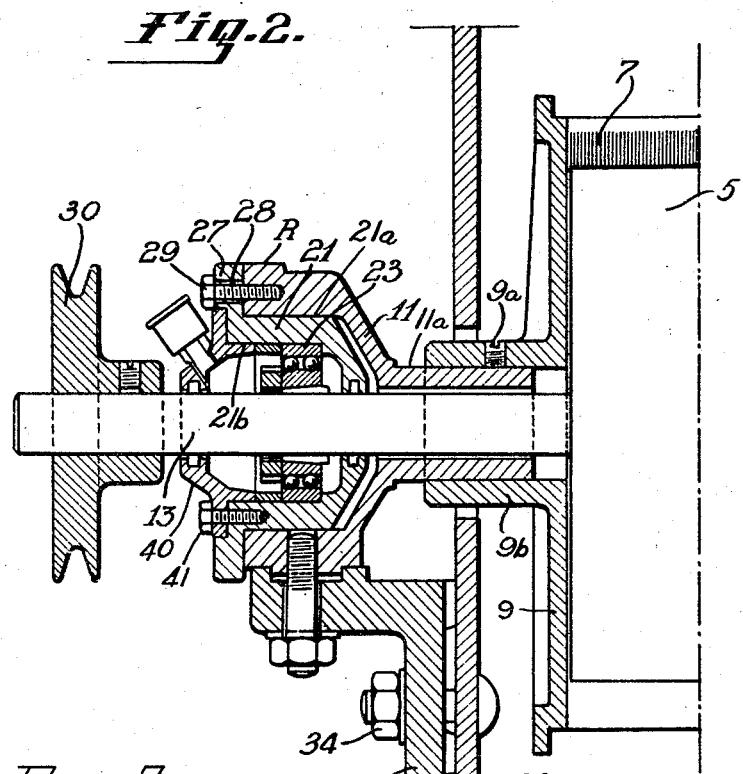
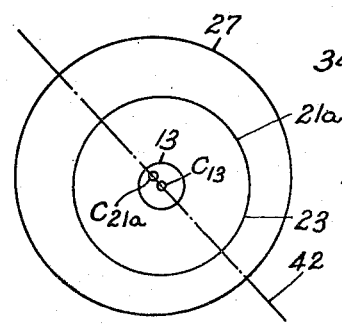
INVENTOR
HUBERT CHARLES MARIE HENRI DUESBERG
BY Richardson, David and Nordon
ATT'YS

United States Patent Office 2,711,562
Patented June 28, 1955

2,711,562

PRECISE ADJUSTMENT MEANS FOR CARDING MEMBERS

Hubert Charles Marie Henri Duesberg, Heusy, Belgium, assignor to Leon Jules Antoine Duesberg, Cornese, and Henri Hubert Marie Duesberg, Heusy-Verviers, Belgium Application January 23, 1951, Serial No. 207,392

Claims priority, application Belgium April 29, 1950

8 Claims. (Cl. 19—98)

The present invention relates to adjustable bearings for supporting a stripping cylinder of a carding engine, and more particularly to calibrated bearings which permit the clothing of the main cylinder to penetrate into the clothing of the stripping cylinder to an accurately measured extent across the full width of the interengaging clothings.

The bearings of the present invention are each independently horizontally adjustable to obtain a reference spacing between the two clothings using a feeler gauge. After the reference spacing has been established, the interaxial distance between the two cylinders may be varied by rotating a pair of eccentric bearing supporting members at opposite sides of the carding engine. Each bearing supporting member is provided with a calibrated scale. Reference to the two scales permits the interaxial distance between the main cylinder and the stripping cylinder to be reduced so that one clothing penetrates into the other to a measured extent which would otherwise be extremely difficult to ascertain. Additionally, the critical parallel relationship between the rotational axes of the cylinders remains unaffected by the adjustment.

It is among the objects of the invention to provide improved means for precisely adjusting the interaxial distance between a main cylinder having a peripheral clothing and a cooperating cylinder having a similar peripheral clothing, the rotational axes of the cylinders being parallel.

Another object of the invention is the provision of means for bringing the rotational axis of the cooperating cylinder into accurately parallel relationship with respect to the axis of the main cylinder, means being provided for subsequent adjustment of the interaxial distance without disturbing the accurate parallel relationship of the two rotational axes.

Still another object of the invention is the provision of means including a pair of calibrated scales, one at each end of the shaft of the cooperating cylinder, whereby the interaxial distance may be precisely varied while retaining the parallel axial relationship by equal angular displacements of eccentric bearing supporting members, the equality of the two angular displacements being determined by reference to the two calibrated scales.

I accomplish the objects of this invention by means of certain novel arrangements and combination of parts hereinafter more fully described and claimed.

In order to make the invention well understood an embodiment thereof will be described, as applied to a cylinder for the continuous stripping of the drum or the main cylinder of a card and given by way of non-limiting example and with reference to the accompanying drawing.

Referring to the drawing:

Figure 1 is a fragmentary view in side elevation showing a portion of a main carding cylinder and the machine frame with a cooperating cylinder and one of a pair of adjusting devices for the cooperating cylinder, the driving pulley for the cooperating cylinder having been omitted for better illustration of the adjusting device.

Figure 2 is a sectional view taken along the line 2—2 of Fig. 1, looking in the direction of the arrows.

Figure 3 is a diagram illustrating on an enlarged scale, the eccentricity of a bearing with respect to a bearing supporting member.

Referring to Fig. 1, the main cylinder 1 of a card is shown provided with a peripheral clothing 3 and a cooperating stripping cylinder 5 is shown provided with a peripheral closing 7 adapted for carding engagement with the clothing 3 of main cylinder 1. The rotational axes of the two cylinders are parallel.

The cooperating cylinder 5 rotates between fixed end flange members 9 secured by set screws 9a threaded in hub portions 9b to engage hollow tubular lateral inward extensions 11a of a pair of bearing housings 11, only one side of the machine being shown. The cooperating stripping cylinder 5 is supported on a drive shaft 13 adjustably journaled in bearing housings 11 as hereinafter described.

Each bearing housing 11 has a circular recess formed therein in which a generally cylindrical eccentric bearing supporting member 21 is rotatably disposed. The external and internal cylindrical lateral surfaces 21a and 21b, respectively, of each bearing supporting member 21 are eccentric with respect to each other. A friction reducing bearing, shown by way of example as a ball bearing 23 is mounted in each eccentric bearing supporting member 21. The inner race of the ball bearing 23 supports the shaft 13 concentrically with respect to its outer race. The ball bearing 23 is retained within the bearing supporting member 21 by an annular flanged retaining member 40 which is secured to bearing supporting member 21 by a group of bolts 41, the retaining member 40 being concentric with the ball bearing 23 and the shaft 13.

Figure 3 illustrates the eccentricity of the bearing 23 and shaft 13 with respect to external cylindrical surface of the bearing supporting member 21. The common center of ball bearing 23 and shaft 13 is indicated at $C_{13}$ and the center of the external surface 21a of the bearing supporting member 21 is indicated at $C_{21a}$. The interaxial direction between cylinders 1 and 5 is indicated by the dot-and-dash line 42. By angular displacement of bearing supporting member 21 in bearing housing 11, the position of the center of ball bearing 23 and shaft 13 may be varied to change the interaxial distance between the main carding drum 1 and the cooperating stripping cylinder 5.

Each bearing supporting member 21 has arcuate slots 28 formed therein near its peripheral edge 27 which receive locking bolts 29 threaded into bearing housing 11. The peripheral edge 27 of bearing supporting member 21 is provided with a calibrated scale consisting of graduations r, 0, II, IV, VI, etc. The top of the bearing housing 11 is provided with a fixed reference index mark R for reading the calibrated scale. The graduation r is a calibration mark the purpose of which is explained below. After first loosening the locking bolts 29, the eccentric bearing supporting members at each side of the carding engine may be rotated to predetermined positions which are ascertained by reference to the fixed index R and the associated calibrated scale of each bearing. The bearing supporting member 21 may be locked in any desired position of adjustment by tightening the locking bolts 29.

The bearing housings 11 are mounted on supporting brackets 22 which are fixed to the supporting frame 33 of the carding engine as by bolts 34. The frame 33 supports both the main cylinder 1 and the cooperating stripping cylinder 5. For simplicity of illustration, only a fragment of frame 33 is shown in the drawing. The bearing housings 11 are rectilinearly movable horizontally on the brackets 22, the direction of linear movement being perpendicular to the rotational axes of the cylinders and having a component directed along the interaxial direction so that the interaxial distance between the cylinders may be varied by changing the horizontal positions of the bearing housings 11 on their respective brackets 22. The brackets 22 have horizontal upper surfaces which avoid any lifting or lowering of the stripping cylinder 5 in the course of moving the bearing housings 11 thereon. The supporting brackets 22 are displaced from a position directly beneath the axis of main carding cylinder 1 which imparts to such horizontal movement of the bearing housings 11 a component directed interaxially with respect to the cylinders 1 and 5 so that their interaxial distance may be varied.

The bearing housings 11 are provided with downwardly extending lug portions 24 which extend on opposite sides of their respective supporting brackets 22. Adjusting bolts 25 pass freely through the lugs 24 and are threaded into aligned tapped holes 26 at opposite sides of each supporting bracket 22. The bolts 25 are provided with lock nuts 25a. By loosening one adjusting bolt 25 and tightening the other, the bearing housing 11 may be rectilinearly displaced. A further vertical bolt 31 serves to lock any desired position of rectilinear adjustment of each bearing housing 11.

The shaft 13 is provided with a pulley 30 which is driven from an appropriate part of the carding engine.

The adjustment of the stripping cylinder 5 is effected in the following manner:

(1) The locking bolts 29 are loosened and the eccentric supporting member 21 of each bearing is rotated to bring its calibration reference graduation r into alignment with the fixed index R. This adjustment is then locked by tightening bolts 29.

(2) Lock nuts 25a are loosened and adjusting screws 25 are manipulated to shift the bearing housings 11 horizontally on their respective supporting brackets 22 until the clothing 3 of main cylinder 1 is spaced precisely 0.2 millimeter (approximately 0.008 inch) away from the clothing 7 of the stripping cylinder 5. This spacing may be conveniently measured for calibration purposes by means of a feeler gauge of 2 millimeters thickness which is inserted between the two clothings. This calibration adjustment is carefully made so that the 0.2 millimeter spacing is uniform throughout the full width of the clothings. This will incidentally assure that the rotational axes of the main and stripping cylinders 1 and 5 are accurately parallel. This calibration adjustment is then locked by means of lock nuts 25a.

(3) Locking bolts 29 are then loosened and the zero mark of each calibrated scale is brought into alignment with its associated fixed index R. The two clothings 3 and 7 should then be just touching each other, which can be checked visually.

(4) Both bearings are then adjusted for operation by turning the bearing supporting member 21 of each bearing to the same extent by reference to the graduations II, IV, VI, etc. of each of the calibrated scales. Each scale graduation corresponds to a decrease of 0.2 millimeter in the interaxial distance between cylinders 1 and 5 and a corresponding penetration of the clothings 3 and 7 into each other. The desired amount of penetration can thus be easily and accurately established for the type of carding operation to be performed and at the same time the critical parallel relationship between the rotational axes of the cylinders 1 and 5 is accurately maintained. The adjustments are locked and unlocked at will by means of locking bolts 29.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. In a carding engine, in combination with a rotatable main cylinder having a peripheral clothing, a cooperating cylinder mounted on a shaft and having a peripheral clothing adapted for carding engagement with the clothing of said main cylinder, both of said cylinders being rotatable about parallel axes, and a supporting frame for said cylinders, the provision of means for precisely adjusting the interaxial distance between said cylinders, said adjusting means comprising: a pair of individually, adjustably movable bearing housings mounted on said frame, the direction of movement of said housings being perpendicular to said rotational axes and having at least a component in the interaxial direction, said bearing housings having aligned cylindrical recesses formed therein; a pair of adjustably rotatable cylindrical bearing supporting members rotatably disposed in said recesses; a pair of bearings freely rotatably supporting said shaft and eccentrically disposed in said bearing supporting member; and means including a pair of calibrated scales each arranged to indicate the relative angular position of one of said bearing supporting members with respect to the bearing housing in which it is disposed, whereby said bearing housings may be moved to bring said rotational axes into accurately parallel relationship and the interaxial distance may be precisely varied while retaining said parallel relationship by equal angular displacements of said bearing supporting members as determined by reference to said calibrated scales.

2. The combination according to claim 1, in which said bearing housings are rectilinearly movable with respect to said frame.

3. The combination according to claim 1, further comprising locking means for retaining said bearing housings and said bearing supporting members in any desired position of adjustment.

4. The combination according to claim 1, further comprising threaded adjusting means interconnecting said frame and each of said bearing housings for moving said housings.

5. A device of the class described, comprising: a main carding cylinder; a stripping cylinder arranged for cooperation with said main carding cylinder; a drive shaft on which said stripping cylinder is rotatably mounted; a pair of bearings in which said shaft is journaled; rotatable eccentric means supporting each bearing for varying the interaxial distance between said main carding and said stripping cylinders; supporting means for said eccentric means, said eccentric means being linearly movable on said supporting means along a direction which has at least a component in the interaxial direction of said cylinders; and adjusting means interconnecting said supporting means and said eccentric means for varying said interaxial distance independently of said eccentric means.

6. A device according to claim 5, in which each of said eccentric means comprises a rotatable cylindrical member having a projecting flange portion with arcuate slots formed therein and a housing member mounted on said supporting means for linear movement thereon, said cylindrical member of said eccentric means being rotatably disposed in said housing member thereof for varying said interaxial distance, said device further comprising a plurality of locking bolts extending through said arcuate slots and engaging said housing member for locking said rotatable cylindrical member in a desired angular position of rotation with respect to said housing member.

7. A device according to claim 6, in which said supporting means comprise a pair of bracket members disposed at a location displaced from directly below the axis of said main carding cylinder, each bracket member having a horizontal upper surface on which one of said housing members is slidably disposed; wherein each housing member comprises two downwardly extending lug portions disposed at opposite sides of one of said horizontal surfaces; and wherein said adjusting means for each housing member comprises a pair of oppositely directed screws extending freely revolubly through said lug portions and threadedly engaging said bracket below said horizontal surface at opposite sides thereof.

8. A device according to claim 6, further comprising a calibrated scale on said flange portion and a fixed index mark on said housing member for reading said calibrated scale, whereby said cylindrical member of each of said eccentric means may be independently rotated to a predetermined position by reference to its associated calibrated scale.

References Cited in the file of this patent

UNITED STATES PATENTS

| | | |
|---|---|---|
| 131,185 | Smith et al. | Sept. 10, 1872 |
| 401,811 | Bebb | Apr. 23, 1889 |
| 889,546 | Proctor | June 2, 1908 |
| 1,299,105 | Atherton et al. | Apr. 1, 1919 |
| 2,396,571 | Gwaltney | Mar. 12, 1946 |

FOREIGN PATENTS

| | | |
|---|---|---|
| 4,950 | Great Britain | of 1892 |
| 421,250 | Great Britain | Sept. 12, 1933 |
| 550,932 | France | Dec. 23, 1922 |